US010941667B2

(12) United States Patent
Figeureu et al.

(10) Patent No.: US 10,941,667 B2
(45) Date of Patent: Mar. 9, 2021

(54) MODULATION OF VANE END SERRATIONS

(71) Applicant: SAFRAN AIRCRAFT ENGINES, Paris (FR)

(72) Inventors: Claire Marie Figeureu, Moissy Cramayel (FR); Eric Pierre Georges Lemarechal, Moissy Cramayel (FR); Benjamin Bulot, Moissy Cramayel (FR); Mathieu Simon Paul Gruber, Moissy Cramayel (FR); Raphael Barrier, Paris (FR); Cyril Polacsek, Clamart (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 73 days.

(21) Appl. No.: 16/174,553

(22) Filed: Oct. 30, 2018

(65) Prior Publication Data
US 2019/0170003 A1 Jun. 6, 2019

(30) Foreign Application Priority Data
Oct. 30, 2017 (FR) ...................................... 1760212

(51) Int. Cl.
*F01D 9/04* (2006.01)
*F01D 5/14* (2006.01)
(Continued)

(52) U.S. Cl.
CPC ............. *F01D 9/041* (2013.01); *F01D 5/141* (2013.01); *F04D 29/544* (2013.01);
(Continued)

(58) Field of Classification Search
CPC ........... F05D 2200/221; F05D 2200/24; F05D 2200/26; F05D 2200/36; F05D 2250/182;
(Continued)

(56) References Cited

U.S. PATENT DOCUMENTS 2,749,473 A * 6/1956 Nelson ...................... H04N 9/28
315/368.19
3,365,126 A * 1/1968 Stoffer .................... F01D 5/141
416/228

(Continued)

FOREIGN PATENT DOCUMENTS

| EP | 1 607 573 A1 | 12/2005 |
| EP | 3 205 826 A1 | 8/2017 |
| FR | 3 023 329 A1 | 1/2016 |

OTHER PUBLICATIONS

Search Report and Written Opinion dated Jul. 24, 2018 in corresponding French Patent Application No. FR1760212 (with English Translation of Category of Cited Documents), citing documents AA, AO-AQ therein, 7 pages.

*Primary Examiner* — Nathaniel E Wiehe
*Assistant Examiner* — Ryan C Clark
(74) *Attorney, Agent, or Firm* — Oblon, McClelland, Maier & Neustadt, L.L.P.

(57) ABSTRACT

A stator vane including a vane root, a vane tip, a leading edge extending between the root and the tip, the leading edge having a serrated profile having a succession of teeth and of troughs each having an amplitude and a thickness, wherein a series of at least three teeth and three consecutive troughs starting from the vane root and/or from the vane tip have a growing amplitude and/or thickness.

9 Claims, 4 Drawing Sheets

Figure 2:
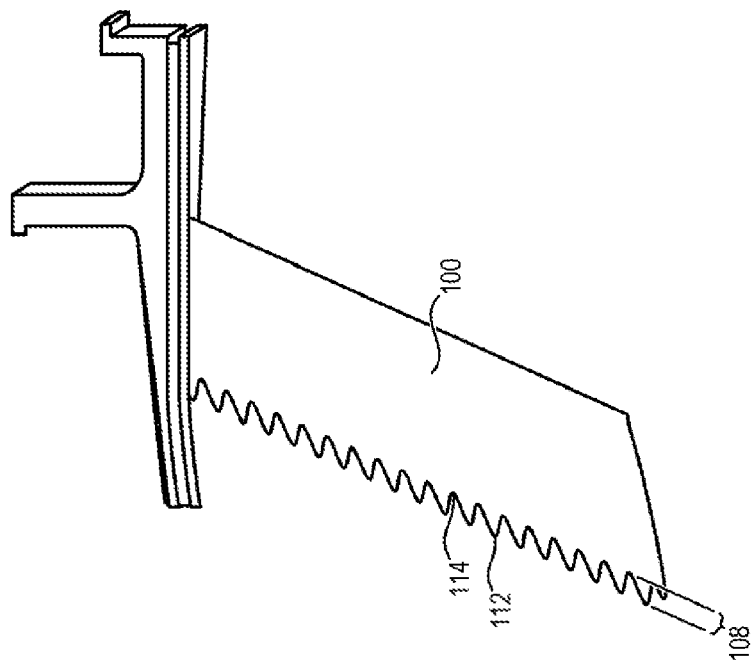

(51) Int. Cl.
  *F04D 29/68*   (2006.01)
  *F04D 29/54*   (2006.01)
  *F04D 29/66*   (2006.01)
  *F01D 25/16*   (2006.01)
  *F01D 5/28*    (2006.01)

(52) U.S. Cl.
  CPC ......... *F04D 29/667* (2013.01); *F04D 29/681* (2013.01); *F01D 5/148* (2013.01); *F01D 5/282* (2013.01); *F01D 25/162* (2013.01); *F05D 2200/221* (2013.01); *F05D 2200/24* (2013.01); *F05D 2200/26* (2013.01); *F05D 2220/36* (2013.01); *F05D 2240/121* (2013.01); *F05D 2250/182* (2013.01); *F05D 2250/183* (2013.01); *F05D 2250/184* (2013.01)

(58) Field of Classification Search
  CPC ......... F05D 2250/183; F05D 2250/184; F05D 2240/121; F01D 9/041; F01D 5/141; F01D 5/148; F01D 5/282; F01D 25/162; F04D 29/667; F04D 29/681
  See application file for complete search history.

(56) References Cited

U.S. PATENT DOCUMENTS

| | | | | |
|---|---|---|---|---|
| 5,455,103 | A  * | 10/1995 | Hoagland | B32B 17/10577 428/167 |
| 2005/0271513 | A1 | 12/2005 | Johann | |
| 2013/0164488 | A1 * | 6/2013 | Wood | F04D 29/324 428/80 |
| 2016/0003095 | A1 | 1/2016 | Romano et al. | |
| 2017/0226865 | A1 | 8/2017 | Kray et al. | |
| 2018/0023403 | A1 * | 1/2018 | Jones | F01D 5/141 415/115 |
| 2018/0283180 | A1 * | 10/2018 | Jain | F01D 25/02 |
| 2020/0148325 | A1 * | 5/2020 | Gea Aguilera | B64C 11/18 |

* cited by examiner

MODULATION OF VANE END SERRATIONS

GENERAL TECHNICAL FIELD

The invention relates to the field of aero-acoustic management of a fixed vane in an aircraft turbomachine or in an aircraft turbomachine test bed.

This type of fixed vane is found for example in OGV (outlet guide vanes), or straighteners disposed downstream of a rotating body, for straightening the flow of air. The term stator vane will be used to designate a fixed vane.

An example will be given for a turbofan with a fan and a straightener disposed in the secondary flow path.

The interaction between the flow rotated by the fan and the straightener in the secondary flow path is the origin of a noise source that is predominant in the total noise generated by the engine, or even by the airplane depending on the operating regime.

PRIOR ART

Several approaches are considered for controlling and/or reducing noise of aerodynamic origin, either by modification of the incident aerodynamic field (aerodynamic excitation), or by modification of the geometry of the stators (aero-acoustic response).

In the second case, a modification of the geometry of the leading edge of the stator vanes has been proposed in the form of undulated leading edges commonly called "wavy leading edge," "serrated leading edge," or "leading edge serrations."

The principal of reducing noise emission generated by the OGV cascade resides in the fact of spatially dephasing the noise sources distributed along the leading edge by means of undulations, identical or not. In order for the principle to apply, the size, (depth, width, thickness) of the undulations must be adapted to the content of the incident aerodynamic field (thickness and deficit of average wakes, size of vortices for turbulence) which varies depending on the operating regime of the engine.

As presented in the references listed below, the geometric variation function along the chord is given by the following equation:

$$c(r)=c_0+h\cdot\sin(2\pi r/\lambda)$$

where $c_0$ is the reference chord, h the amplitude and $\lambda$ the wavelength of the undulations and r the radius.

The angle $\theta$ expressed below is a key parameter in noise reduction. Its value is determined by the following formula, illustrated in FIG. 1:

$$\theta=a\tan(4h/\lambda)$$

The value of $\lambda$ is selected based on the wavelength of the turbulence of the fluid arriving at the leading edge of the vane.

Figure 3:
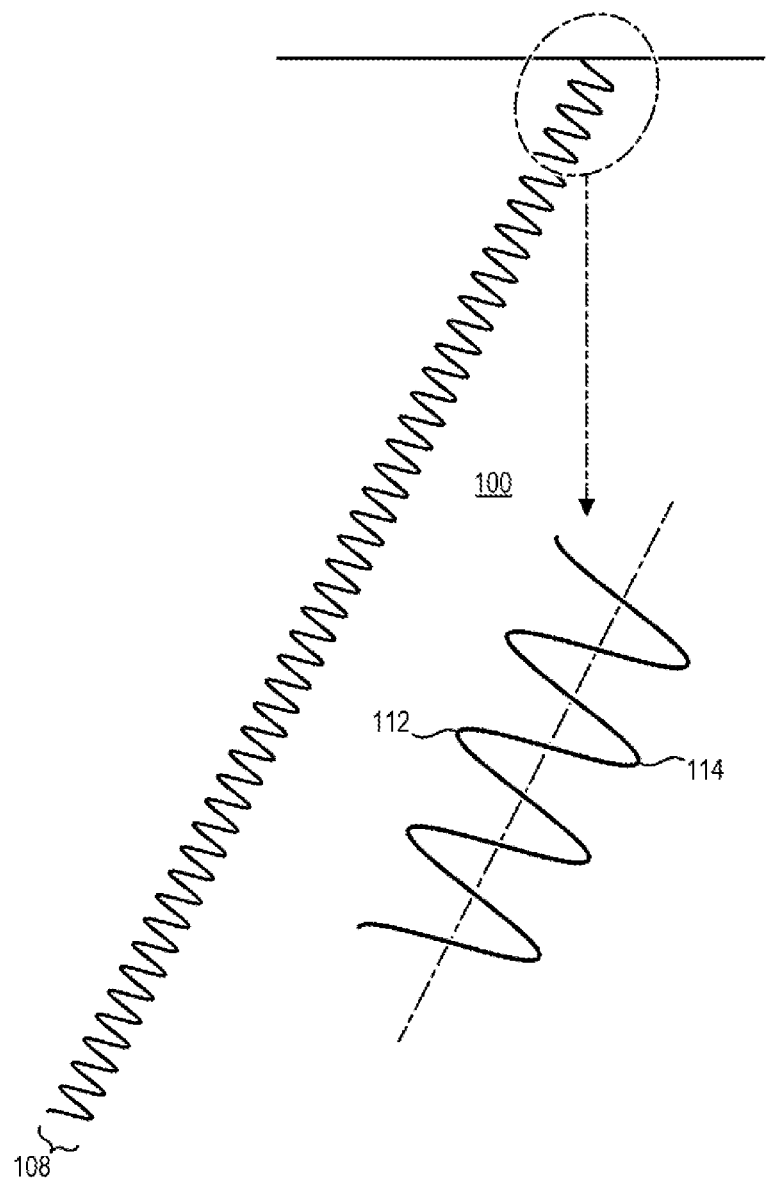

FIG. 2 illustrates the result of the application of these formulas on vanes 100, where teeth 112 and troughs 114 of the leading edge and periodic undulations are observed. FIG. 3 shows schematically these teeth and troughs.

However, the presence of teeths 112 at the leading edge 108 reduces considerably the mechanical status of the OGV, with strong stress concentrations in the troughs of the teeth.

In fact, under aerodynamic forces the blade bends tangentially, which induces a transverse shear effect from one tooth to another. Thus the longer the teeth, the smaller the radius of the troughs of the teeth, the greater the stress in the troughs of the teeth will be.

However, this observation is the inverse of the desired acoustic gain because the latter is maximized for teeth that are thin and long.

There exists therefore a need for solutions allowing vanes with serrated profiles to be protected.

PRESENTATION OF THE INVENTION

To this end, the invention proposes a stator vane comprising:
  a vane root,
  a vane tip,
  a leading edge extending between the root and the tip, the leading edge having a serrated profile having a succession of teeth and of troughs each having an amplitude and a thickness.
characterized in that a series of at least three teeth and three consecutive troughs starting from the vane root and/or from the vane tip have a growing amplitude and/or thickness.

The invention can comprise the following features, taken alone or in combination:
  the series comprises at least four teeth and four troughs,
  the series extends between 20 and 50% of the length of the vane,
  the serrated profile is of the sinusoidal type in which, within the series, the amplitude and/or the thickness of the teeth and of the troughs is combined with a linear, parabolic, sinusoidal or exponential function,
  the serration profile is expressed in the following form:

$$c(r)=c_0+h\cdot\sin(2\pi r/\lambda)$$

Where $c_0$ is the reference chord, h the amplitude and $\lambda$ the wavelength of the undulations and r the radius
    within the series, the amplitude and/or the thickness of the teeth and of the troughs is combined with a linear function so that the profile is expressed within said series by:

$$c(r)=c_0+h\cdot\sin(2\pi r/\lambda)\cdot K\cdot r$$

where K is a constant,
or
a parabolic function so that the profile is expressed within said series:

$$c(r)=c_0+h\cdot\sin(2\pi r/\lambda)\cdot L\cdot r^2$$

where L is a constant,
or
a sinusoidal function so that the profile is expressed within said series:

$$c(r)=c_0+h\cdot\sin(2\pi r/\lambda)\cdot\sin(M\pi/2\cdot r)$$

where M is a constant,
or
an exponential function so that the profile is expressed within said series:

$$c(r)=c_0+h\cdot\sin(2\pi r/\lambda)\cdot\exp(N\cdot r)$$

where N is a constant.
  the vane is made of composite material,
  the amplitude of the first trough or of the first tooth from the tip or from the root of the vane is nonzero.

The invention also relates to a straightener ring comprising a plurality of vanes as described previously, the vanes being distributed circumferentially around a hub.

The invention also relates to a turbomachine or a test bed comprising a vane or a ring as previously described.

This consists of a turbomachine or for example a test bed of a partial turbomachine, this assembly being for example a single entry straightener of the partial turbomachine by constituting a flow path which would correspond to a secondary flow path considering the case of a complete turbomachine.

PRESENTATION OF THE FIGURES

Figure 1:
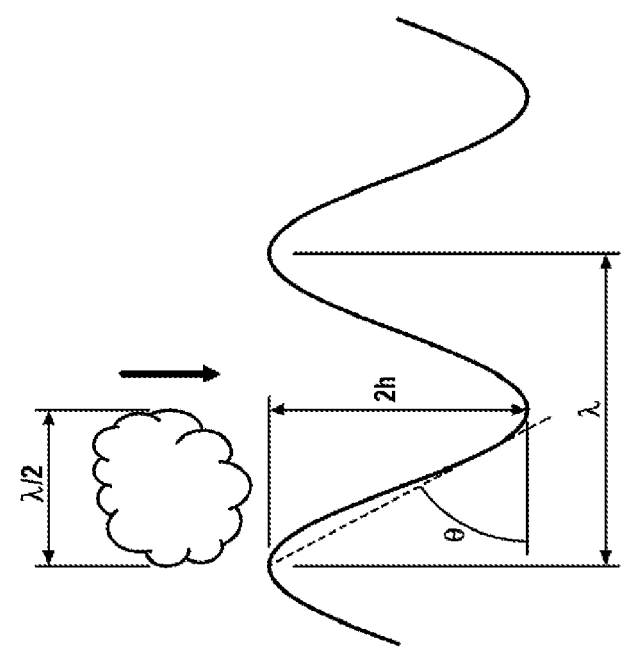
Figure 4:
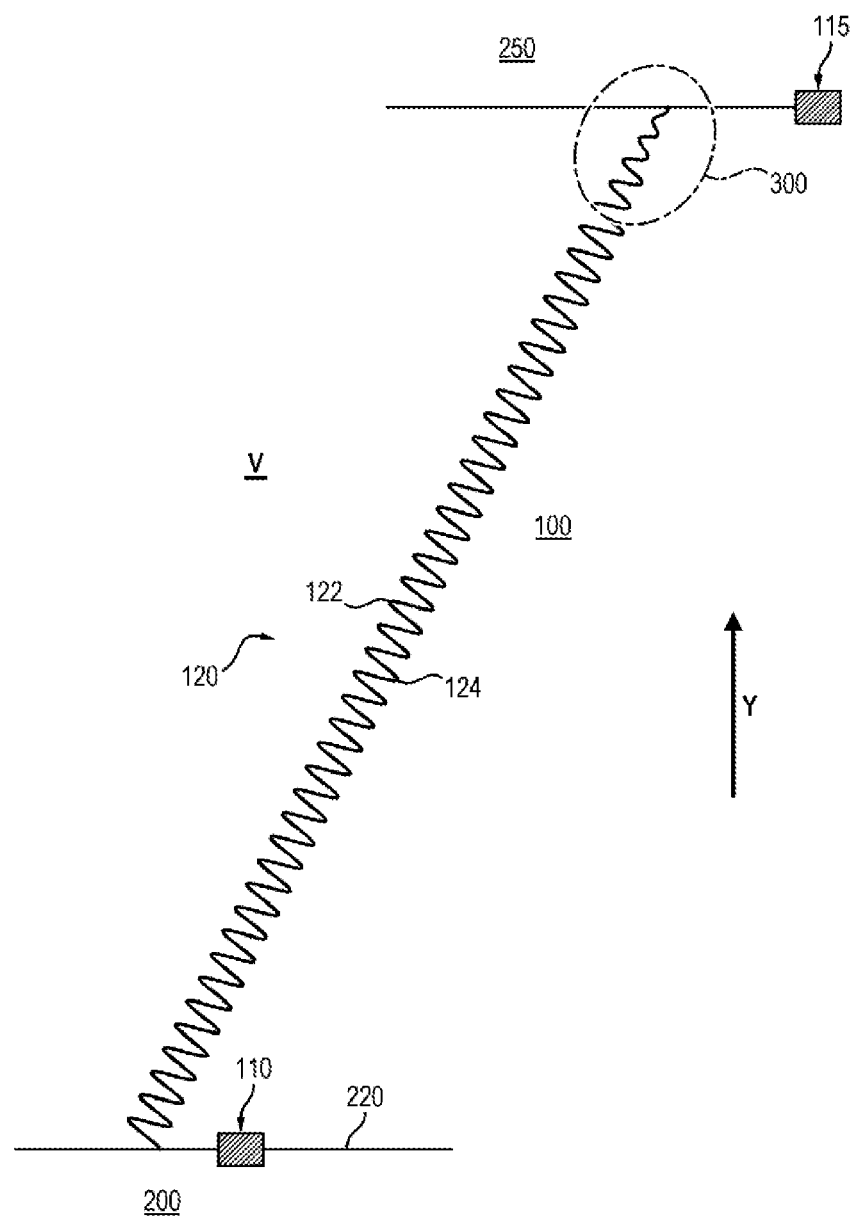
Figure 5:
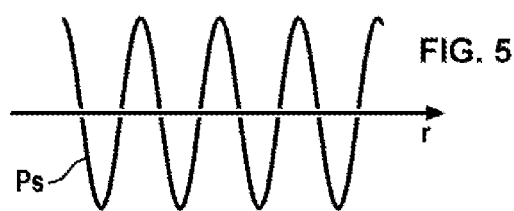

Other features, aims and advantages of the invention will be revealed by the description that follows, which is purely illustrative and not limiting, and which must be read with reference to the appended drawings, in which:

FIG. 1 shows a schematic illustrating the quantities defining a serrated profile, FIGS. 2 and 3 illustrate a portion of a stator vane with a serrated profile, and an enlargement of it, FIG. 4 illustrates a portion of a stator vane with a serrated profile conforming to an embodiment of the invention, FIG. 5 illustrates a sinusoid, FIGS. 6 to 9 illustrate sinusoids combined with different functions within the scope of the invention.

DETAILED DESCRIPTION

Placing the following within the scope of a portion of a turbomachine, typically a flow path which could be equivalent to a secondary flow path of a turbofan with a straightener (OGV) disposed at the fan outlet. It can therefore be the scope of a test bed, for example for single-entry straighteners or any other type of test bed in which a fixed vane is used. Such a test bed is for example a partial engine allowing for example the validation of the data on phenomena representative of those occurring customarily in the secondary flow path of a complete engine.

FIG. 4 illustrates a portion of a vane 100 comprising a vane root 110 at one end, which is typically a radially internal end of the vane 100. The vane root 110 attaches to a hub 200, axially symmetrical around a longitudinal axis, which corresponds to a main axis of rotation of the portion of the turbomachine. The hub 200 generally forms a part of the primary body of a turbofan. The vane 100 extends in a radial direction Y with respect to the hub 200 (each vane therefore has its own radial direction Y).

At another, radially external, end, the vane 100 is attached to a casing 250 by a vane tip 115.

To form the flow path V, an interior platform 220 can be provided radially beyond the hub 200, which has no aerodynamic function.

The vane 100 has a profiled shape to straighten the flow, with in particular a pressure side and a suction side. The vane 100 root 110 can have a shape continuing the pressure side and the suction side.

The vane 100 comprises a serrated leading edge 120, that is one which has undulations in the form of an alternation of teeth 122 and of troughs 124, with for example a sinusoidal pattern as described in the introduction.

The vane 100 can be made of metal or of composite material (resin matrix with reinforcements, typically of carbon).

In order to protect the serrated profile, one objective of the invention is to relieve mechanically the teeth and troughs where stresses are the highest.

To this end, as illustrated in FIG. 4, a series 300 of at least three teeth 122 and three consecutive troughs 124, starting from the vane root 110 and/or from the vane tip 115. In other words, this series 300 comprises the serrations closest to the edge of the flow path V.

In this series, the amplitude of the teeth 122 and of the troughs 124 decreases when approaching the vane root 110 or the vane tip 115. Alternately or in addition, it is the thickness of the leading edge 120 that increases when approaching the vane root 110 or the vane tip 115.

This series 300 can be located at the vane tip 115 and/or and the vane root 110.

The amplitude is defined as the distance between the peaks (of the tooth or of the trough) with respect to a straight profile. It therefore corresponds to the "$h \sin(2\pi r/\lambda)$" of the formula given in the introduction.

The thickness is defined at the straight profile for a zero tooth or trough amplitude). In fact, the thickness of the vane 100 is variable between upstream and downstream of the vane: it is for example thinner at the peaks of the teeth 122 than at the peaks of the troughs 124.

Such a vane 100 allows distributing the load by smoothing the stress over several serrations.

Hereafter in the application, only "reduction in amplitude" will be discussed, which can be replaced with "increase in thickness."

To ensure this continuity, the reduction in amplitude can be governed by formulas.

Recall the placement in the scope of a vane 100 of which the serrated profile is defined by the following shape:

$$c(r) = c_0 + h \cdot \sin(2\pi r/\lambda)$$

Where $c_0$ is the reference chord, h the amplitude and $\lambda$ the wavelength of the undulations and r the radius. By radius is meant the positioning along the leading edge 120 (which extends radially from the longitudinal axis, hence the term radius). It is assumed that r=0 signifies that the location is against the edge of the flow path V, either at the vane tip 115 or at the vane root 110.

The equation is conceptually simplified by considering that $\lambda$ is an arbitrarily fixed constant.

This regular sinusoidal profile Ps is illustrated in FIG. 5.

Several embodiments allow the serrations in the series 300 to be modulated.

Figure 6:
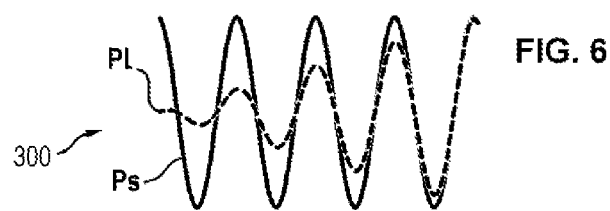

In one embodiment illustrated in FIG. 6, the reduction occurs according to a linear function. The profile Pl in the series 300 is then expressed in the following form:

$$c(r) = c_0 + h \cdot \sin(2\pi r/\lambda) \cdot K \cdot r$$

where K is a constant selected depending on the desired speed of reduction.

Figure 7:

In one embodiment illustrated in FIG. 7, the reduction occurs according to a parabolic function. The profile Pp is then expressed in the following form:

$$c(r) = c_0 + h \cdot \sin(2\pi r/\lambda) \cdot L \cdot r^2$$

where L is a constant selected depending on the desired speed of reduction.

Figure 8:
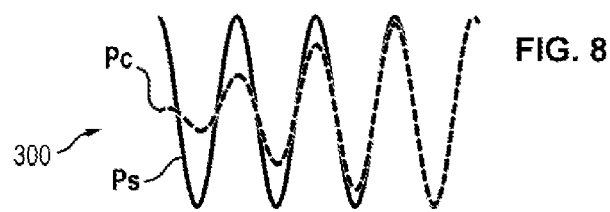

In one embodiment illustrated in FIG. 8, the reduction occurs according to a sinusoidal function. The profile Pc is then expressed in the following form:

$$c(r) = c_0 + h \cdot \sin(2\pi r/\lambda) \cdot \sin(M\pi/2 \cdot r)$$

where M is a constant selected depending on the desired speed of reduction.

Figure 9:
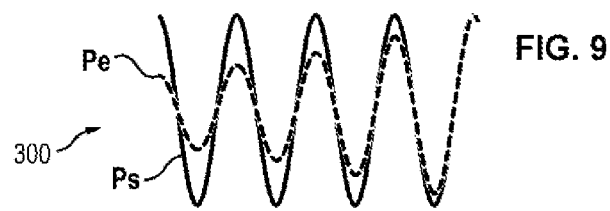

In one embodiment illustrated in FIG. 9, the reduction occurs according to an exponential function. The profile Pe is then expressed in the following form:

$$c(r) = c_0 + h \cdot \sin(2\pi r/\lambda) \cdot \exp(N \cdot r)$$

where N is a constant selected depending on the desired speed or reduction.

Any continuous function strictly decreasing in the direction of the root 110 or of the tip 115 of the vane is usable in practice.

Preferably, the first tooth 122 or the first trough 124 is prevented from having zero amplitude, because that would only carry the load over to the next tooth or trough. To this end, it is sufficient to integrate a slight offset, of the type r-r0, into the equations given above.

In one embodiment, the series 300 comprises four, or even five troughs and five successive teeth.

In one embodiment, the series 300 extends between 20 and 50% of the length of the vane 100 into the flow path.

It is possible to combine the variations of amplitude and thickness, so as to create a vane 100 profile that is three-dimensionally variable.

In addition to a turbomachine, this vane 100 can be mounted within the scope of a test bed or of a test turbomachine.

The invention claimed is:

1. An outlet guide vane comprising:
 a vane root configured to be attached to a hub;
 a vane tip configured to be attached to a casing; and
 a leading edge extending between the vane root and the vane tip, the leading edge having a serrated profile having a succession of teeth and of troughs each having an amplitude and a thickness,
 wherein the serrated profile includes a series of at least three teeth and three consecutive troughs starting from at least one of the vane root or the vane tip, the series having at least one of an amplitude or a thickness of the teeth and of the troughs that follows a growing function, the growing function being a linear, parabolic, sinusoidal, or exponential function.

2. The outlet guide vane according to claim 1, wherein the series comprises at least four teeth and four troughs or extends between 20 and 50% of a length of the outlet guide vane.

3. The outlet guide vane according to claim 1, wherein the serrated profile follows a sinusoidal.

4. The outlet guide vane according to claim 1, wherein the serrated profile follows the following function:

$$c(r)=c_0+h\cdot\sin(2\pi r/\lambda)$$

wherein $c_0$ is a reference chord, h is an amplitude and $\lambda$ is a wavelength of undulations and r is a radius and wherein, within the series, at least one of the amplitude or the thickness of the teeth and of the troughs follows a linear function so that the serrated profile follows within said series the following function:

$$c(r)=c_0+h\cdot\sin(2\pi r/\lambda)\cdot K\cdot r$$

where K is a constant,
or
wherein within the series, at least one of the amplitude or the thickness of the teeth and of the troughs follows a parabolic function so that the serrated profile follows within said series the following function:

$$c(r)=c_0+h\cdot\sin(2\pi r/\lambda)\cdot L\cdot r^2$$

L is a constant,
or
wherein, within the series, at least one of the amplitude or the thickness of the teeth and of the troughs follows a sinusoidal function so that the serrated profile follows within said series the following function:

$$c(r)=c_0+h\cdot\sin(2\pi r/\lambda)\cdot\sin(M\pi/2\cdot r)$$

where M is a constant,
or
wherein, within the series, at least one of the amplitude or the thickness of the teeth and of the troughs follows an exponential function so that the serrated profile follows within said series the following function:

$$c(r)=c_0+h\cdot\sin(2\pi r/\lambda)\cdot\exp(N\cdot r)$$

where N is a constant.

5. The outlet guide vane according to claim 1, wherein the outlet guide vane is made of composite material.

6. The outlet guide vane according to claim 1, wherein the amplitude of the first trough or of the first tooth from the vane tip or from the vane root of the outlet guide vane is nonzero.

7. A straightener ring comprising a plurality of outlet guide vanes according to claim 1, the outlet guide vanes being distributed circumferentially around a hub.

8. A turbomachine or test bed comprising an outlet guide vane according to claim 1.

9. The outlet guide vane according to claim 1, wherein an entire length of the leading edge includes the serrated profile.

* * * * *

UNITED STATES PATENT AND TRADEMARK OFFICE
CERTIFICATE OF CORRECTION

PATENT NO. : 10,941,667 B2
APPLICATION NO. : 16/174553
DATED : March 9, 2021
INVENTOR(S) : Claire Marie Figeureu et al.

It is certified that error appears in the above-identified patent and that said Letters Patent is hereby corrected as shown below:

In the Claims

Column 5, Line 39, change "sinusoidal" to --sinusoidal function--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*